US011353326B2

(12) United States Patent
Fink

(10) Patent No.: US 11,353,326 B2
(45) Date of Patent: Jun. 7, 2022

(54) TRAVERSE AND TRAJECTORY OPTIMIZATION AND MULTI-PURPOSE TRACKING

(71) Applicant: Arizona Board of Regents on Behalf of the University of Arizona, Tucson, AZ (US)

(72) Inventor: Wolfgang Fink, Montrose, CA (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 689 days.

(21) Appl. No.: 15/450,890

(22) Filed: Mar. 6, 2017

(65) Prior Publication Data

US 2017/0254657 A1 Sep. 7, 2017

Related U.S. Application Data

(60) Provisional application No. 62/304,299, filed on Mar. 6, 2016.

(51) Int. Cl.
*G01C 21/30* (2006.01)
*G01C 21/34* (2006.01)
(Continued)

(52) U.S. Cl.
CPC .......... *G01C 21/005* (2013.01); *G01C 21/20* (2013.01); *G05D 1/0217* (2013.01); *G05D 1/0274* (2013.01); *G05D 2201/0218* (2013.01)

(58) Field of Classification Search
None
See application file for complete search history.

(56) References Cited

U.S. PATENT DOCUMENTS 6,028,819 A * 2/2000 Mullarkey ............. G01V 1/003
367/37
7,272,474 B1 * 9/2007 Stentz ..................... G01C 7/04
701/26

(Continued)

OTHER PUBLICATIONS

"Rowan McAllister, Thierry Peynot, Robert Fitch and Salah Sukkarieh, Motion Planning and Stochastic Control with Experimental Validation on a Planetary Rover, Oct. 7-12, 2012, IEEE/RSJ International Conference on Intelligent Robots and Systems, pp. 4716-4723" (Year: 2012).*

(Continued)

*Primary Examiner* — Peter D Nolan
*Assistant Examiner* — Demetra R Smith-Stewart
(74) *Attorney, Agent, or Firm* — Thomas | Horstemeyer, LLP

(57) ABSTRACT

Various examples are provided for object identification and tracking, traverse-optimization and/or trajectory optimization. In one example, a method includes determining a terrain map including at least one associated terrain type; and determining a recommended traverse along the terrain map based upon at least one defined constraint associated with the at least one associated terrain type. In another example, a method includes determining a transformation operator corresponding to a reference frame based upon at least one fiducial marker in a captured image comprising a tracked object; converting the captured image to a standardized image based upon the transformation operator, the standardized image corresponding to the reference frame; and determining a current position of the tracked object from the standardized image.

16 Claims, 17 Drawing Sheets

(51) Int. Cl.
*G01C 21/36* (2006.01)
*G05D 1/00* (2006.01)
*G05D 1/02* (2020.01)
*G01C 21/00* (2006.01)
*G01C 21/20* (2006.01)

(56) References Cited

U.S. PATENT DOCUMENTS

| | | | | |
|---|---|---|---|---|
| 7,403,856 | B2* | 7/2008 | Moscovitz | G01C 21/005 |
| | | | | 702/5 |
| 8,224,024 | B2* | 7/2012 | Foxlin | G06T 7/73 |
| | | | | 348/135 |
| 9,014,848 | B2* | 4/2015 | Farlow | B25J 11/009 |
| | | | | 700/245 |
| 9,119,670 | B2* | 9/2015 | Yang | A61B 5/055 |
| 9,141,113 | B1* | 9/2015 | Ivanov | G05D 1/0676 |
| 9,400,503 | B2* | 7/2016 | Kearns | B25J 11/009 |
| 9,538,892 | B2* | 1/2017 | Fong | G05D 1/0274 |
| 2001/0034482 | A1* | 10/2001 | Webber | A61B 6/12 |
| | | | | 600/407 |
| 2007/0236366 | A1* | 10/2007 | Gur | G06K 9/00 |
| | | | | 340/945 |
| 2008/0247510 | A1* | 10/2008 | Gertner | A61N 5/10 |
| | | | | 378/65 |
| 2010/0274387 | A1* | 10/2010 | Pitzer | G05D 1/0274 |
| | | | | 700/246 |
| 2011/0082566 | A1* | 4/2011 | Herr | A61F 2/68 |
| | | | | 623/24 |
| 2011/0167574 | A1* | 7/2011 | Stout | G05D 1/0219 |
| | | | | 15/3 |
| 2011/0231050 | A1* | 9/2011 | Goulding | G05D 1/0891 |
| | | | | 701/26 |
| 2013/0060146 | A1* | 3/2013 | Yang | A61B 5/055 |
| | | | | 600/476 |
| 2013/0345718 | A1* | 12/2013 | Crawford | A61B 17/025 |
| | | | | 606/130 |
| 2014/0136414 | A1* | 5/2014 | Abhyanker | G06Q 10/087 |
| | | | | 705/44 |
| 2014/0207282 | A1* | 7/2014 | Angle | H04L 12/282 |
| | | | | 700/257 |
| 2014/0267230 | A1* | 9/2014 | Osuna | A63F 13/822 |
| | | | | 345/419 |
| 2016/0016312 | A1* | 1/2016 | Lawrence, III | G01N 21/9515 |
| | | | | 700/98 |
| 2016/0121486 | A1* | 5/2016 | Lipinski | B05B 13/0431 |
| | | | | 427/427.3 |
| 2016/0297072 | A1* | 10/2016 | Williams | B25J 9/1697 |
| 2017/0199525 | A1* | 7/2017 | Albaghajati | G05D 1/0214 |
| 2019/0018420 | A1* | 1/2019 | Yee | A47L 9/2852 |

OTHER PUBLICATIONS

Fink, W. "Stochastic Optimization Framework (SOF) for Computer-Optimized Design, Engineering, and Performance of Multi-Dimensional Systems and Processes" in Proc. SPIE, vol. 6960, 69600N (2008).

Fink, W., Huntsberger, T.L., and Aghazarian, H. "Dynamic Optimization of N-Joint Robotic Limb Deployments" in Journal of Field Robotics, vol. 27, Issue 3, p. 268-280 (2010).

Kirkpatrick, S., Gelat, C.D., Vecchi, M.P. (1983) Optimization by Simulated Annealing, Science, 220, 671-680.

Fink W, Baker VR, Flammia M, Tarbell MA (2015) Rover Traverse-Optimizing Planner For Multi-Objective Deployment Scenarios; IEEE Aerospace Conference Proceedings, paper #2722, Big Sky, Montana; DOI: 10.1109/AERO.2015.7119314.

Fink W, Baker VR, Flammia M, Tarbell MA (2015) Avoiding Planetary Rover Damage by Multi-Objective Rover Traverse Optimization [abstract 1353]. In 46th Lunar and Planetary Science Conference Abstracts [CD-ROM], Lunar and Planetary Institute, Houston.

* cited by examiner

Translation

Scaling

Rotations

TRAVERSE AND TRAJECTORY OPTIMIZATION AND MULTI-PURPOSE TRACKING

CROSS REFERENCE TO RELATED APPLICATIONS

This application claims priority to, and the benefit of, U.S. provisional application entitled "Multi-Purpose Tracking and Traverse Optimization" having Ser. No. 62/304,299, filed Mar. 6, 2016, which is hereby incorporated by reference in its entirety.

BACKGROUND

Route planning is utilized in a wide range of applications such as, for example, travel and/or transportation logistics, surgical procedure planning, electrical circuit and chip design, movement of artificial limbs and stimulation of paralyzed limbs, infrastructure and urban planning, and geographic information system (GIS) data planning. Adjustments to the route may be enhanced by tracking the movement of the object or other item as it traverses along the route.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
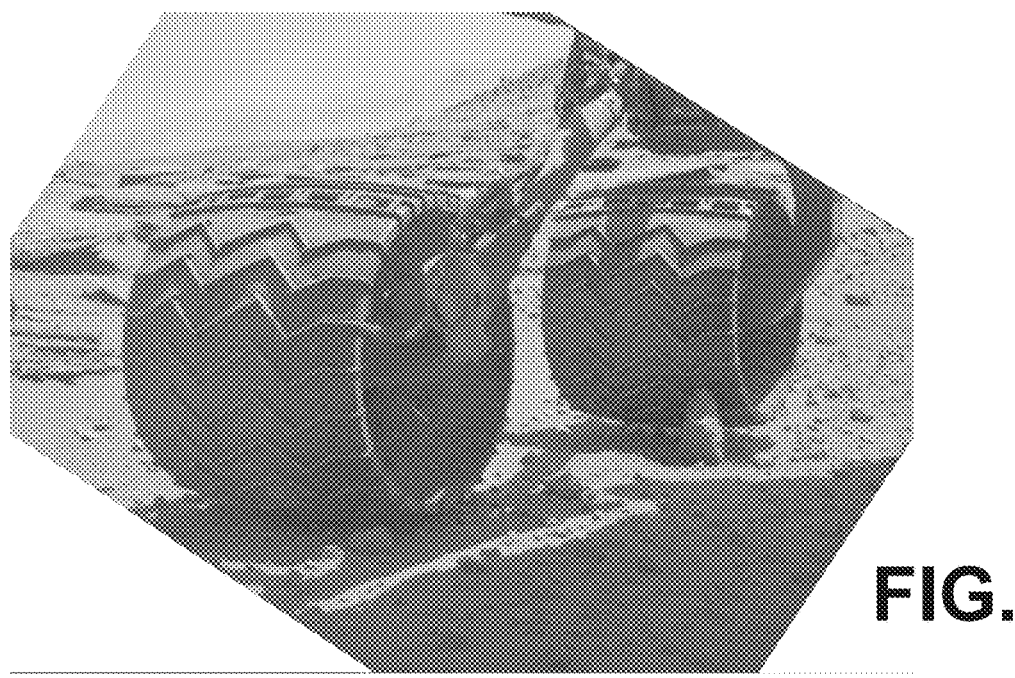
FIGS. 1A and 1B are images illustrating wheel damage of the Curiosity rover on Mars.

Disclosed herein are various examples related to object identification and tracking, traverse-optimization and/or trajectory optimization. Traverse planning is related to the generation of path or route information of a vehicle or other object. Object tracking can aid in real time adjustments to the movement of the object and/or the planned route. Reference will now be made in detail to the description of the embodiments as illustrated in the drawings, wherein like reference numbers indicate like parts throughout the several views.

Optimized planning for vehicle traversal applies to many contexts. For example, traverse/mission planning for a deployed rover (e.g., on Mars) can utilize surface terrain analysis, with the goal of minimizing some traverse aspects (e.g., distance) and maximizing others (e.g., terrain smoothness). This is a largely manual process carried out by teams of individuals that is both time intensive and mentally exhausting. Even with a small number of constraints, the results are at best functional compromises balancing the various potentially mutually exclusive optimization goals.

A traverse optimizing planner (TOP) is introduced here, which generates optimized traverse routes using a multivariate stochastic optimization algorithm based on terrain data. The TOP makes it possible to quickly and accurately generate traverses (or traverse routes) that can be optimized in numerous simultaneous constraints such as, but not limited to, the lowest number of deployment segments, the shortest traverse based on three-dimensional (3D) Euclidian distance measure, the smoothest traverse with respect to terrain roughness, the least altitude change, or combinations of these or other constraints. Additional constraints which can be supported by the terrain data can be added directly to the TOP system. Waypoints (as well as avoidance points) can be assigned to each traverse, and numerous alternate (Pareto-optimal) traverses can be generated for each deployment scenario. Depending on the ground-truth in-situ assessment of terrain data traversability by a deployed rover (e.g., Curiosity), TOP allows for frequent replanning or adaptation of traverses and/or missions. While the TOP is discussed here with respect to an example of a planetary rover (e.g., on Mars), it is equally applicable to a wide variety of other applications (e.g., the movement of transport or other vehicles on Earth, or movement of a paralyzed and/or artificial limb). The following description is not intended to limit its applicability to other situations.

Rover traverse planning is to some degree analogous to the generation of in-flight trajectory predict data for interplanetary spacecraft. Predict data can represent such diverse mission elements as, e.g., known and forecasted spacecraft location, space debris avoidance, velocity, and ephemeris data. Of similar importance is the traversal of trajectories by a rover on a planetary surface (or other vehicle through a region). Currently, traverse/mission planning for deployed rovers (e.g., on Mars) requires a group of planetary scientists to spend many hours engaged in laborious surface terrain analysis, with the goal of minimizing certain traverse aspects (e.g., distance) and/while maximizing others (e.g., terrain smoothness). This is a largely manual process, and the results are at best functional compromises balancing the various potentially mutually exclusive optimization goals. Terrain types can be mapped from orbit as an aid to mission planning, both for deciding targets for investigation and for anticipating issues of traversing terrains. Issues can include, e.g., problems of steep slopes, such as on the slip faces of sand dunes, as well as potentially damaging zones of rugged rock strewn surfaces.

Figure 1B:
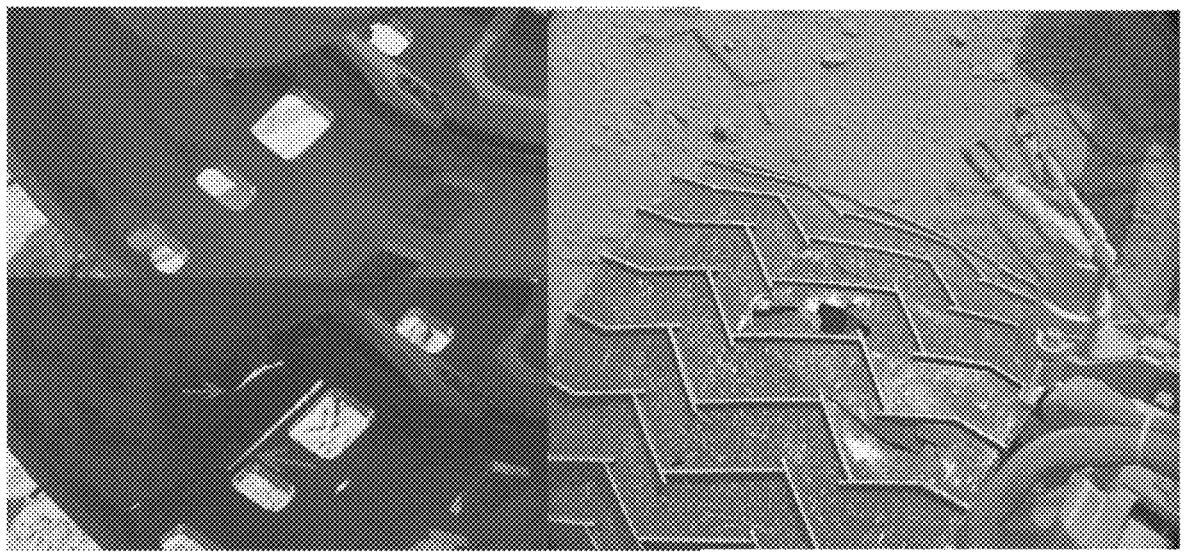

During the Mars Science Laboratory (MSL) mission, the Curiosity rover was scheduled to traverse over a wide area. During the initial phase, problematic terrains were not encountered, however as the rover traveled larger distances images of the rover's wheels revealed a marked increase in the rate of damage, principally in the form of dents, punctures, and tears, as illustrated by the images of FIGS. 1A and 1B. FIG. 1A shows an example of the rover encountering a sharp rock that does not move. The images of FIG. 1B show spreading of cracks through the wheel's skin, along the tracks, and on the outer surface of the wheel. It was found that the worst wheel damage occurred from pyramidal sharp-edged pebbles about 8-11 mm in diameter, which is small enough to fit between the wheel grousers. Damage occurred when the rover was passing over areas of jagged caprock, exposing an abundance of sharp-edged, cm-sized hard rock clasts, and lacking a protective mantle of finer sediments. The hardness of the sedimentary conglomerates seems to derive from very strong cementation.

Orbit-derived interpretation of surface roughness was combined with ground-based observations of rock abundance and soil/rock surface characteristics to work out criteria for identifying those terrains that would be least damaging to the rover's wheels. These criteria were then used to laboriously plot out paths of minimal potential damage for the traverse to Mount Sharp on Mars. The proposed routes to ascend the mountain will encounter a new range of terrain types, and it can be expected that this might also lead to surprises in regard to potentially damaging zones that will need to be traversed, circumnavigated, or circumvented.

To address these challenges, the traverse-optimizing planner (TOP) comprises an automated system which generates optimized traverses using a multivariate stochastic optimization algorithm based on, in one instantiation, 3D terrain data. TOP makes it possible to quickly and accurately generate traverses optimized in numerous simultaneous constraints such as, but not limited to, the lowest number of deployment segments, the shortest traverse based on 3D Euclidian distance measure, the smoothest traverse with respect to terrain roughness, the traverse with the smoothest average roughness across deployment steps, the least altitude change, the least average altitude change across deployment steps, or combinations of these or other constraints. The TOP can be extended to other situations including, but not limited to, route planning for travel and transportation logistics (e.g., package delivery or airlines), surgical probe planning, electric circuit and/or chip design, movement of artificial limbs and/or electrical stimulation of paralyzed limb(s), infrastructure planning (e.g., urban planning), and/or other planning based on geographic information system (GIS) data.

Figure 4:
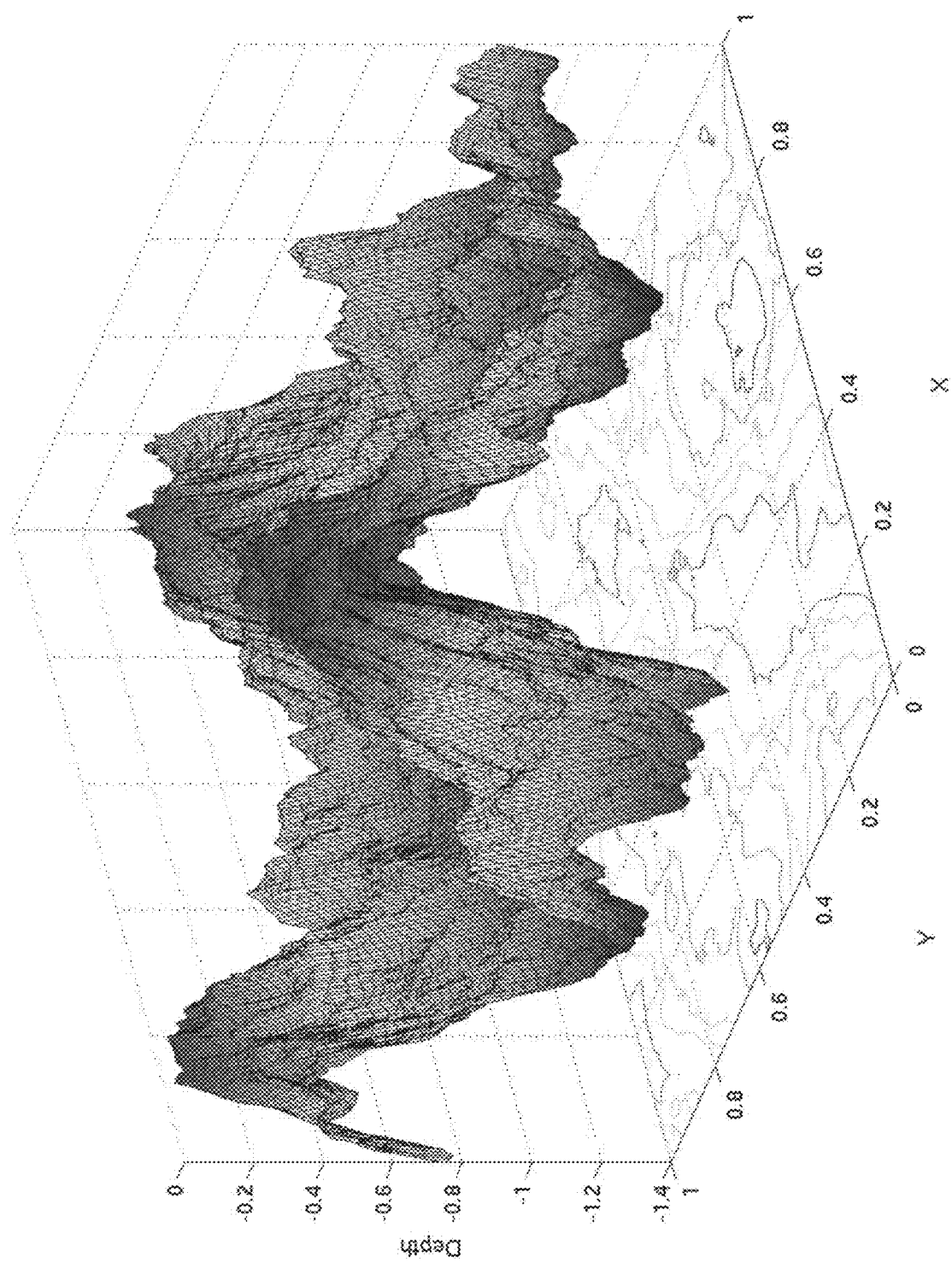
FIG. 4 illustrates an example of a fractal landscape, in accordance with various embodiments of the present disclosure.

Artificially generated terrain maps, as well as associated feature, terrain type, or characteristic maps, can be utilized. Various terrain-generating processes (or algorithms) can be employed such as, e.g., fractal-based terrain generators. FIG. 4 illustrates an example of a fractal landscape from the IEEE Congress on Evolutionary Computation International "Huygens Probe" Optimization Competition (2006). Actual topography maps can also be utilized. For example, terrain maps can be obtained with orbiting laser altimeters (e.g., the Mars Orbiter Laser Altimeter (MOLA) on the Mars Global Surveyor (MGS)). Other localized scanning techniques can also be used to generate appropriate mappings such as, e.g., MRI or PET scanning for surgical procedure planning, real-time x-ray and/or fiducial marker tracking. In some embodiments, topography maps can be obtained or constructed from data stored in existing databases.

Traverse-Optimizing Planner using a Stochastic Optimization Framework. Existing navigation and/or path/trajectory planning algorithms can be employed to find paths to targets in 2D and under controlled, static environments. However, they may not be optimal, if at all applicable, in a 3D context such as, e.g., long-term traverse planning for planetary rovers. To address this deficiency, the TOP can employ a stochastic optimization framework (SOF), for traverse planning. In addition to possibly being computationally bounded and less computationally intensive, SOF has the advantage of accounting for a much less well-defined and constantly changing real-world environment, e.g., as would be encountered by mobile robotic surface probes.

Figures 5, 6:
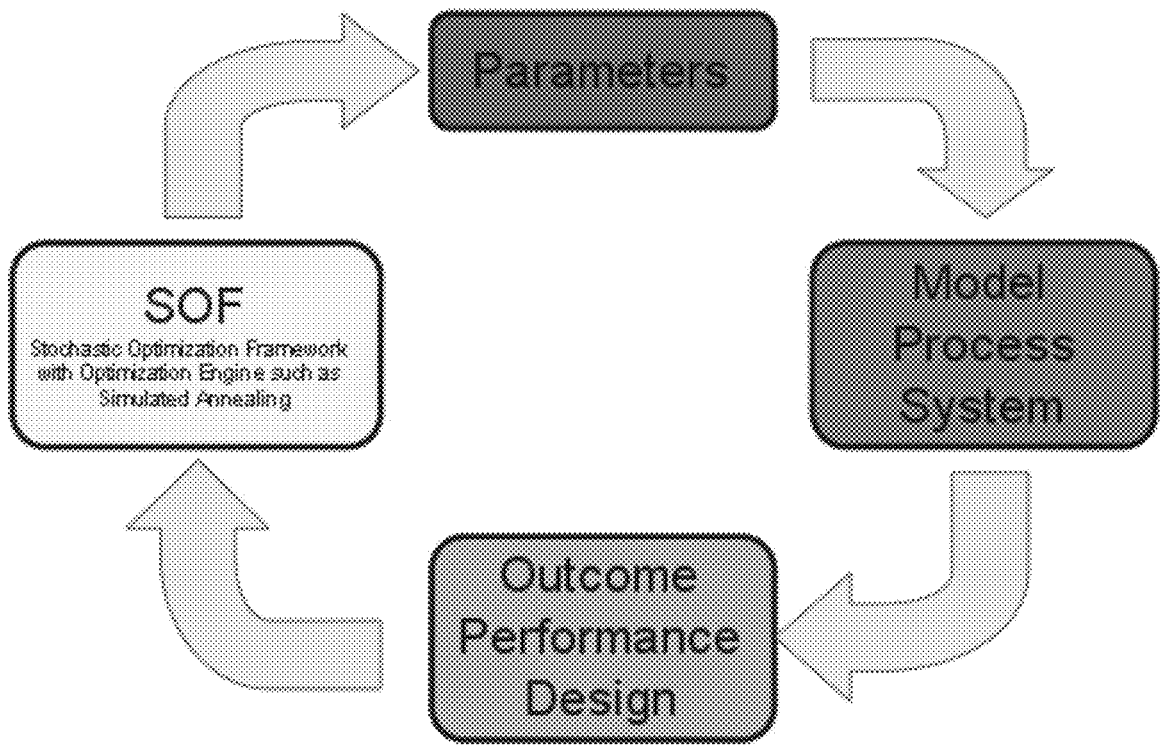
FIG. 5 is a schematic diagram illustrating an example of functional flow of a stochastic optimization framework (SOF), in accordance with various embodiments of the present disclosure.
FIG. 6 is a table illustrating results for traverses generated by the traverse optimizing planner (TOP) based upon five constraints, in accordance with various embodiments of the present disclosure.

FIG. 5 is a schematic diagram illustrating the functional flow of the SOF. An efficient simulated annealing algorithm, or genetic algorithm, or evolutionary algorithm, or similar algorithm can be employed as part of the SOF. The SOF can efficiently sample the parameter space intrinsic to a model, process, or system (1) by repeatedly running the model, process, or system, and (2) by comparing the respective outcomes against a desired outcome, which results in a fitness measure. The goal of the SOF is to optimize this fitness by using, e.g., simulated annealing algorithms as the optimization engine to optimize for the traverse under given constraints. A more extensive discussion of SOF is provided by "*Stochastic Optimization Framework (SOF) for Computer-Optimized Design, Engineering, and Performance of Multi-Dimensional Systems and Processes*" by W. Fink (Proc. SPIE, Vol. 6960, 2008), which is hereby incorporated by reference in its entirety.

In the case of the TOP, the overall traverse optimization can be driven by minimizing the Euclidian distance between the start location (e.g., of the rover) and a target location. However, instead of just going for the shortest distance, SOF can be engaged to allow the traverse to "meander" while optimizing for the respective mission constraint, e.g., shortest traverse based on 3D Euclidian distance measure, smoothest traverse with respect to terrain roughness, least altitude change, or combinations of these or other constraints.

Once a valid traverse (e.g., route or path) has been determined via the SOF, a deterministic clean-up procedure can be engaged to prune the "raw" traverse to its shortest connected path among the points visited by the rover (or other vehicle or object). This pruned traverse can then be compared against the respective optimization constraint, and the overall optimization continues until a user-defined number of overall traverses has been reached (or exceeded), or until the user's mission constraints are satisfied (or exceeded).

Figure 2:
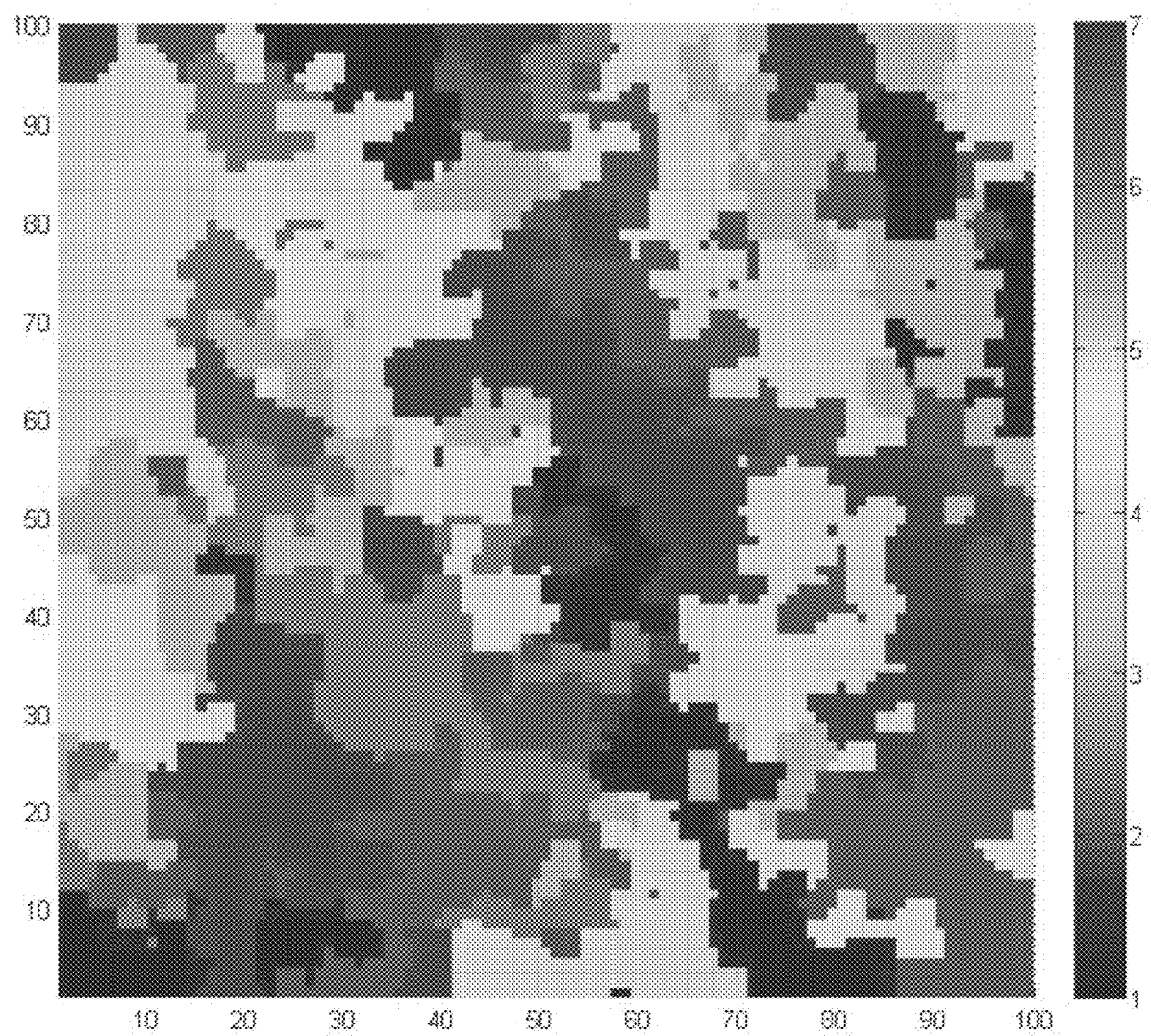
FIG. 2 illustrates an example of a two-dimensional (2D) terrain type map having a range of terrain roughness or traversability, in accordance with various embodiments of the present disclosure.
Figure 3:
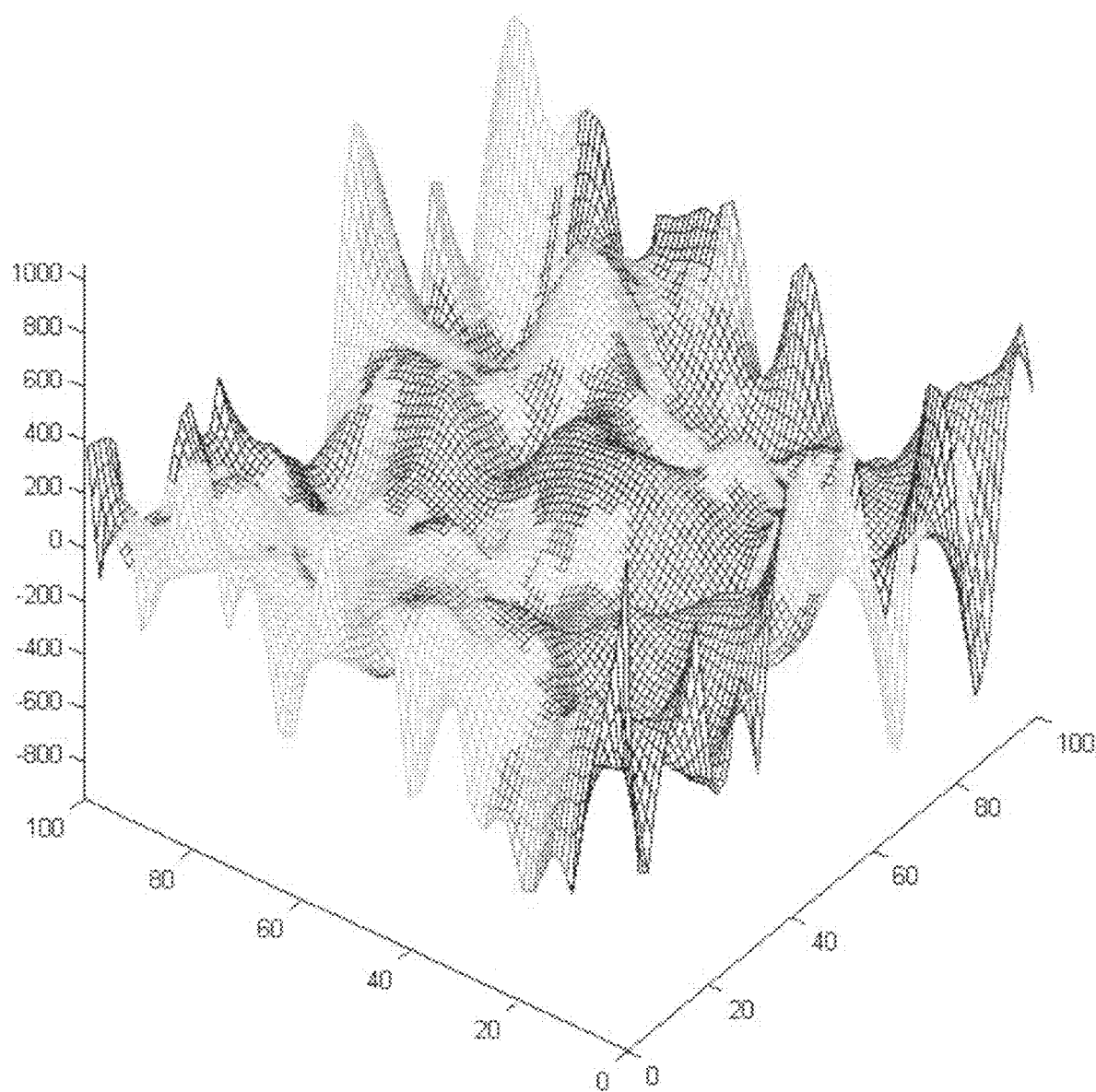
FIG. 3 illustrates an example of a three-dimensional (3D) terrain plot with superimposed terrain roughness or traversability from FIG. 2, in accordance with various embodiments of the present disclosure.

Simulation Results. For the 3D terrain depicted in FIG. 3 and the associated 2D terrain type map of FIG. 2, a rover deployment scenario was simulated that would relocate the rover from a start location (0,0) to a target location (99,99) under the following different optimization requirements:

0. Start traverse with no optimization for all subsequent scenarios;

1. Minimum overall traverse length (see FIG. 7A);
2. Minimum average terrain roughness (see FIG. 7B);
3. Maximum average terrain roughness (see FIG. 7C);
4. Minimum average terrain slope (see FIG. 7D); and
5. Maximum average terrain slope (see FIG. 7E).

While scenarios (3) and (5) may be unrealistic mission goals, they serve to illustrate the optimization capabilities of the TOP to better appreciate the results for deployment scenarios (2) and (4). The numerical results for the respective traverses generated by the TOP are summarized in the table of FIG. 6 with the resulting trajectories shown in the corresponding plots of FIGS. 7A through 7E.

Figure 7A:
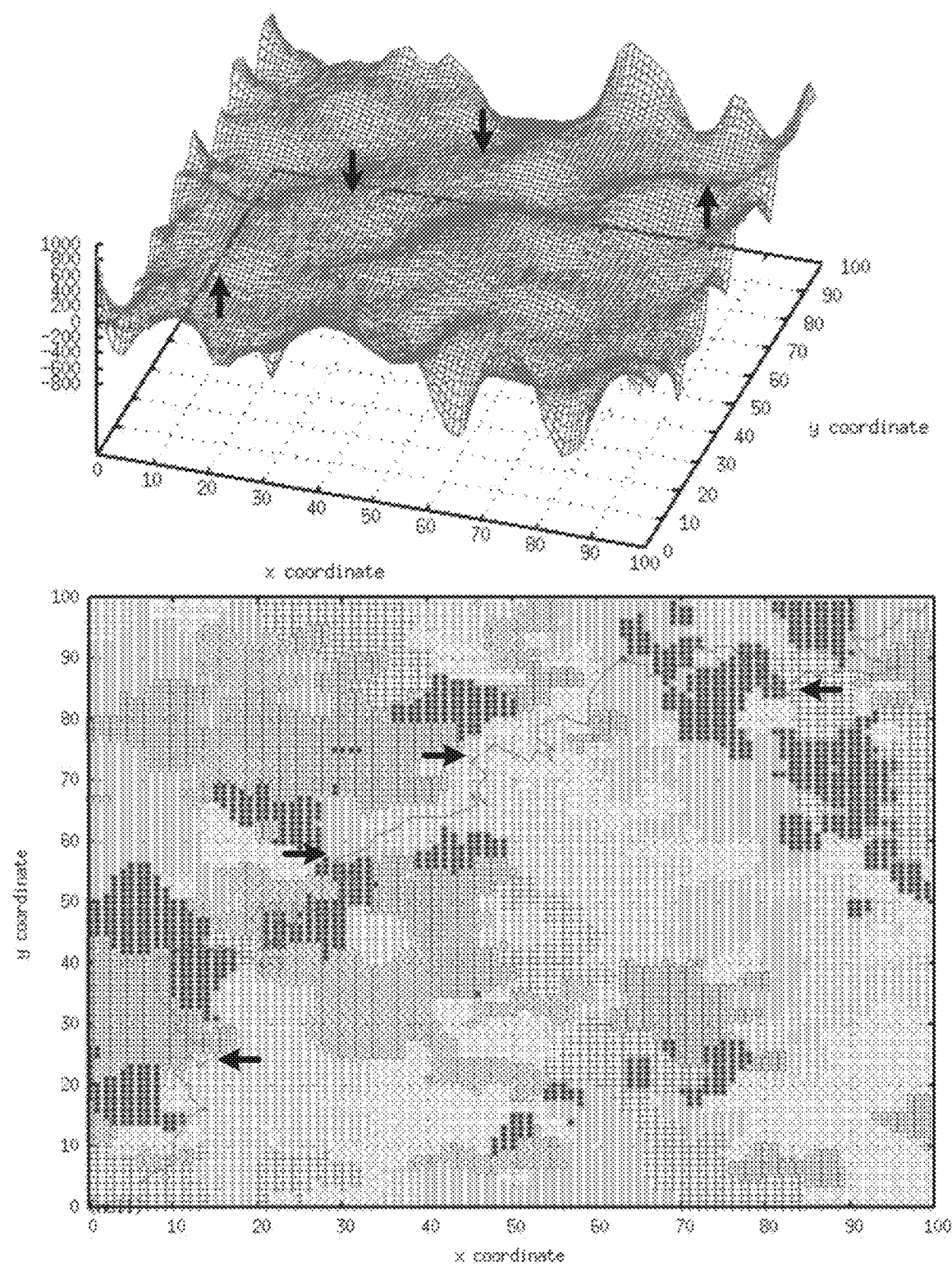
FIGS. 7A through 7E are plots illustrating the traverses generated by the TOP based upon the five constraints of FIG. 6, in accordance with various embodiments of the present disclosure.
Figure 7B:
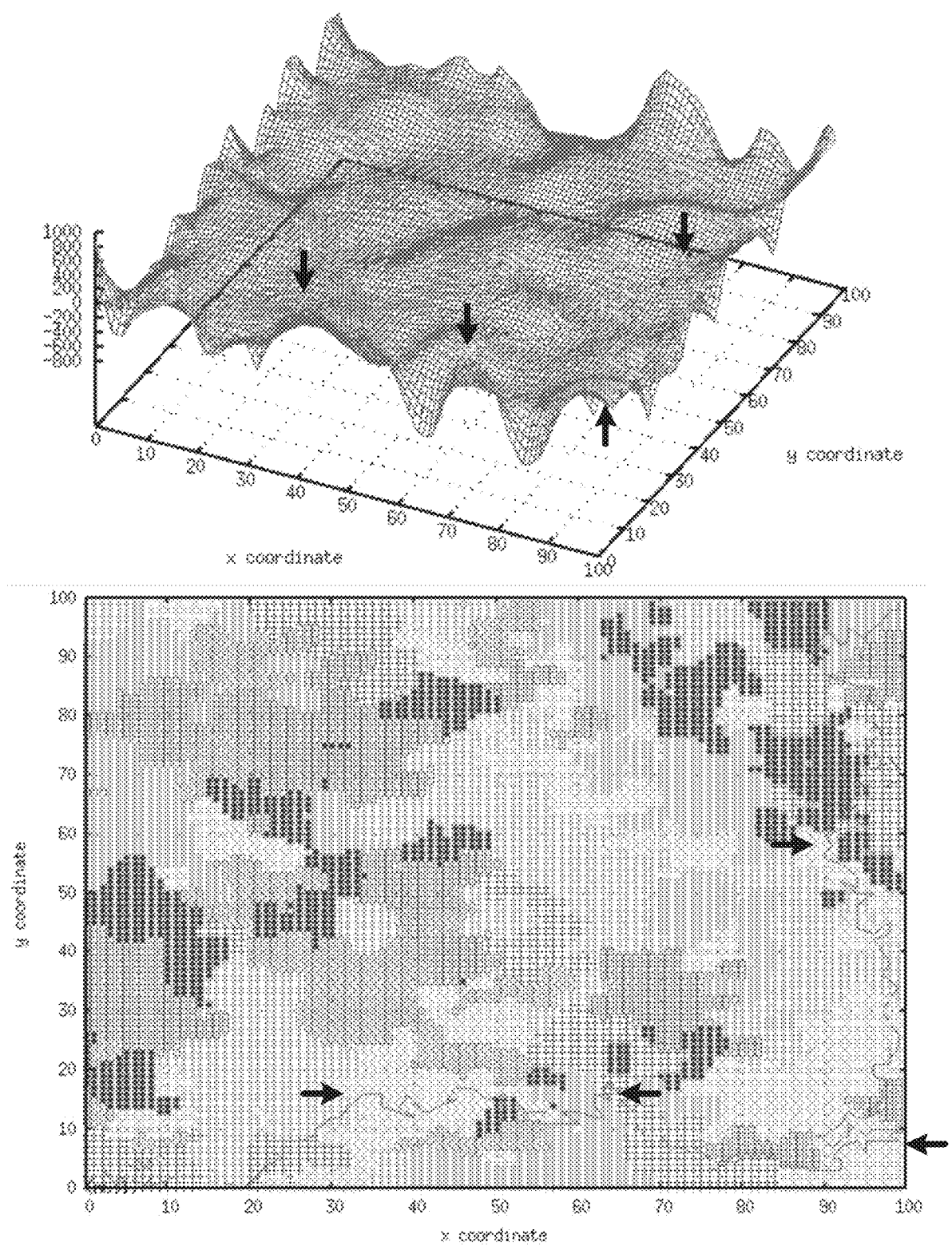
Figure 7C:
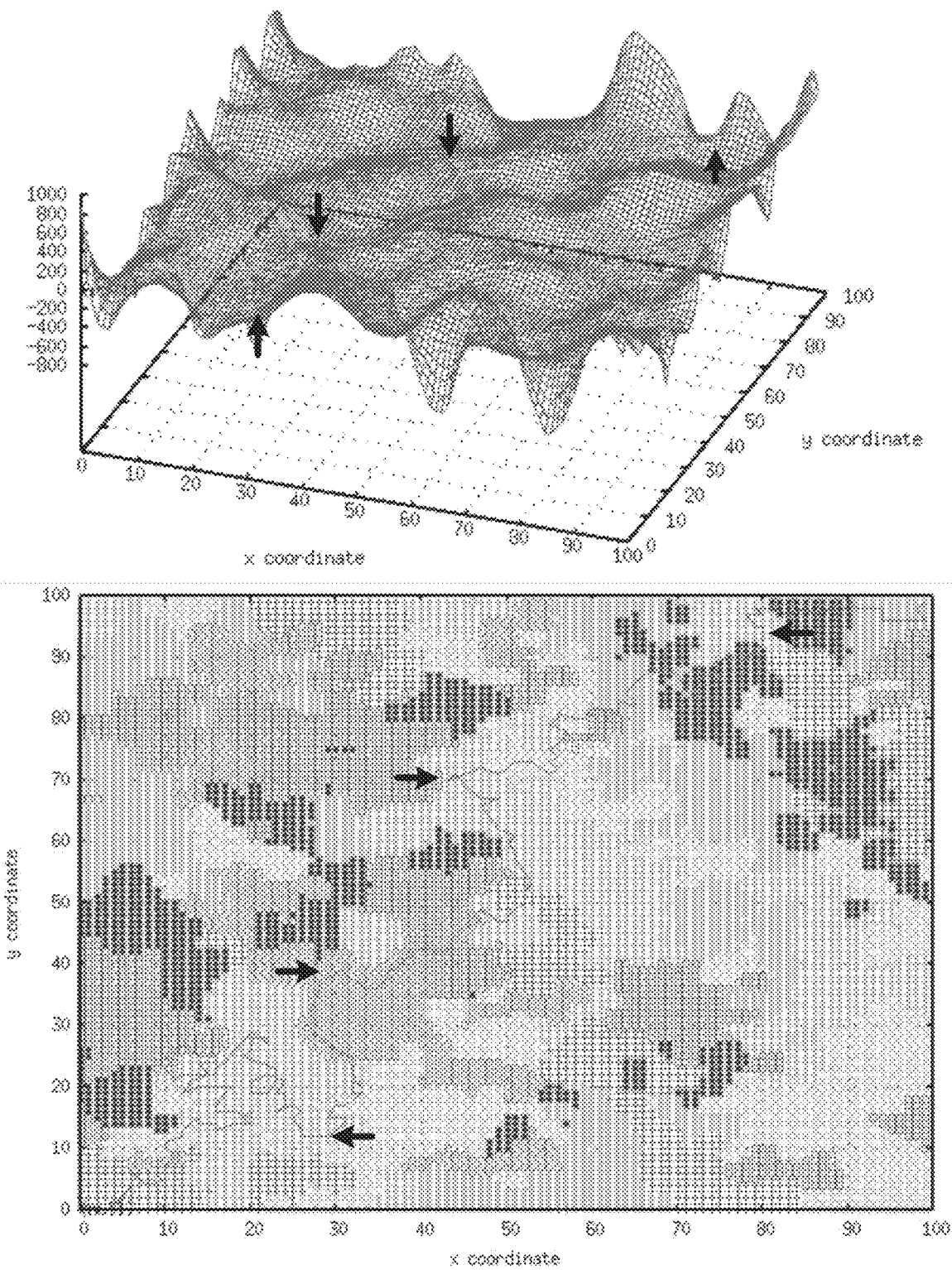
Figure 7D:
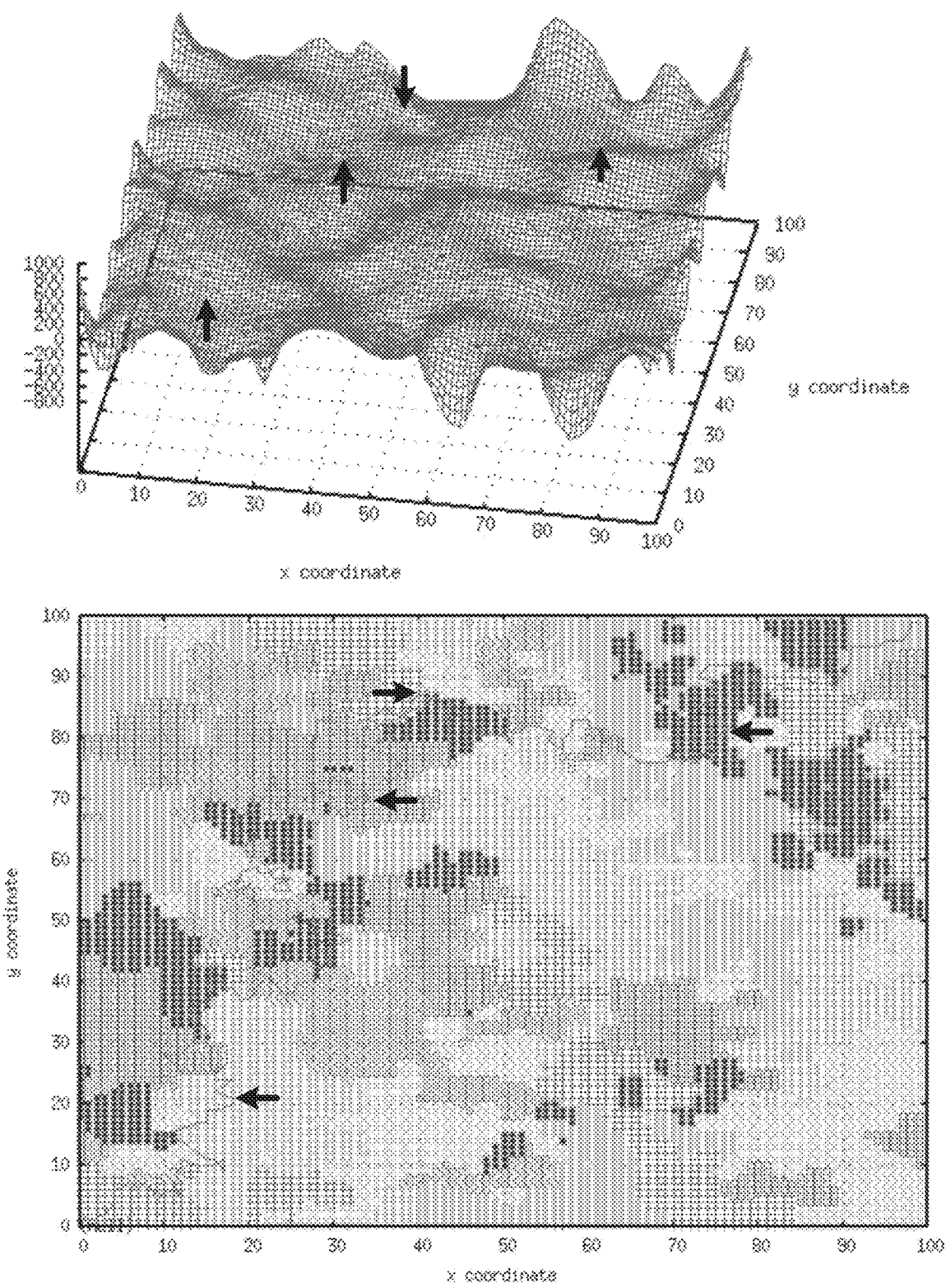
Figure 7E:
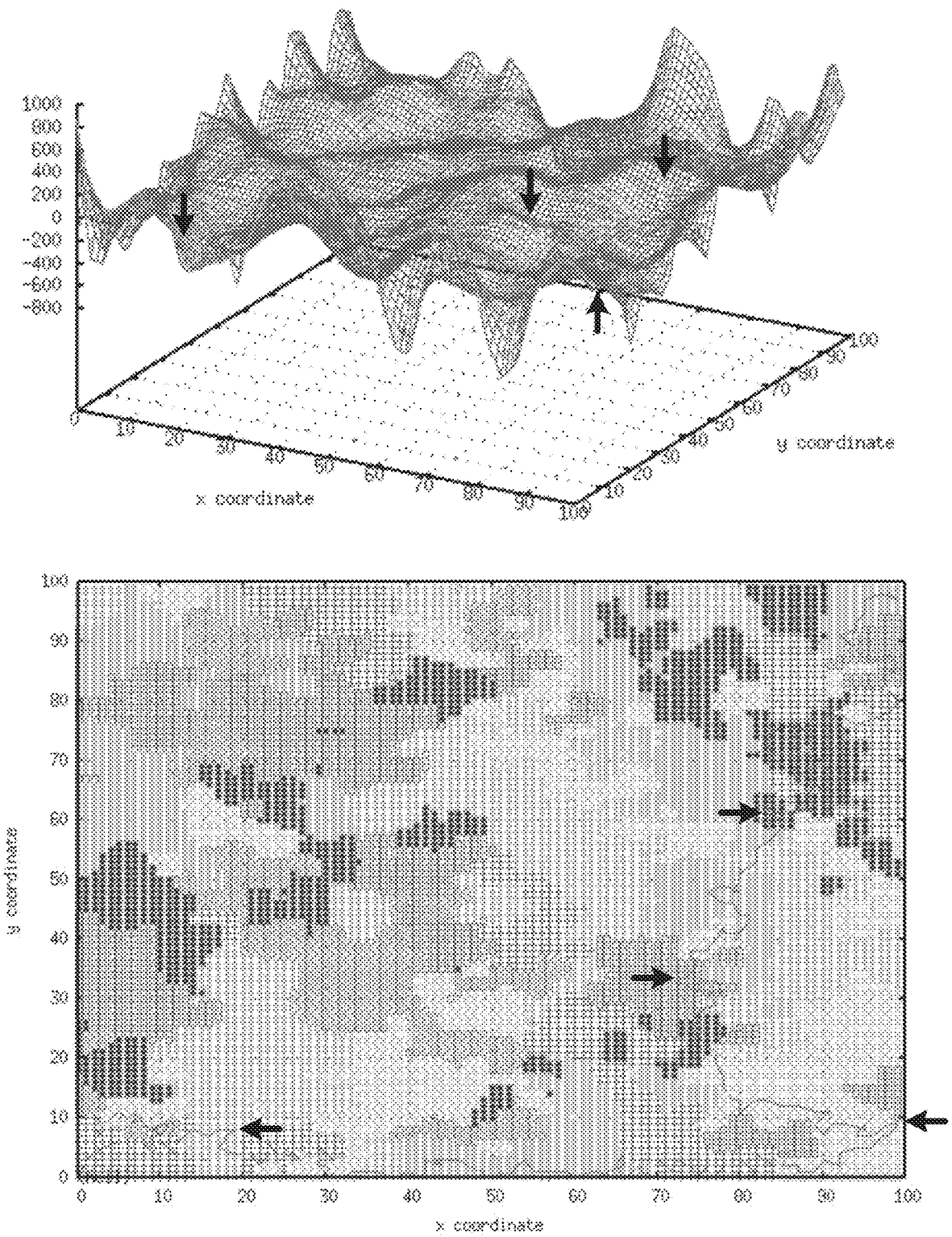

Beginning with FIG. 7A, shown are the 3D altitude map (top) and 2D terrain type map (bottom) including the resulting trajectory for the shortest overall traverse length (optimization scenario #1). The arrows are used to illustrate corresponding sections along the resulting trajectory. FIG. 7B shows the 3D altitude map (top) and 2D terrain type map (bottom) including the resulting trajectory for the minimum average terrain roughness (optimization scenario #2). FIG. 7C shows the 3D altitude map (top) and 2D terrain type map (bottom) including the resulting trajectory for the maximum average terrain roughness (optimization scenario #3). FIG. 7D shows the 3D altitude map (top) and 2D terrain type map (bottom) including the resulting trajectory for the minimum average terrain slope (optimization scenario #4). FIG. 7E shows the 3D altitude map (top) and 2D terrain type map (bottom) including the resulting trajectory for the maximum average terrain slope (optimization scenario #5).

Figure 8A:
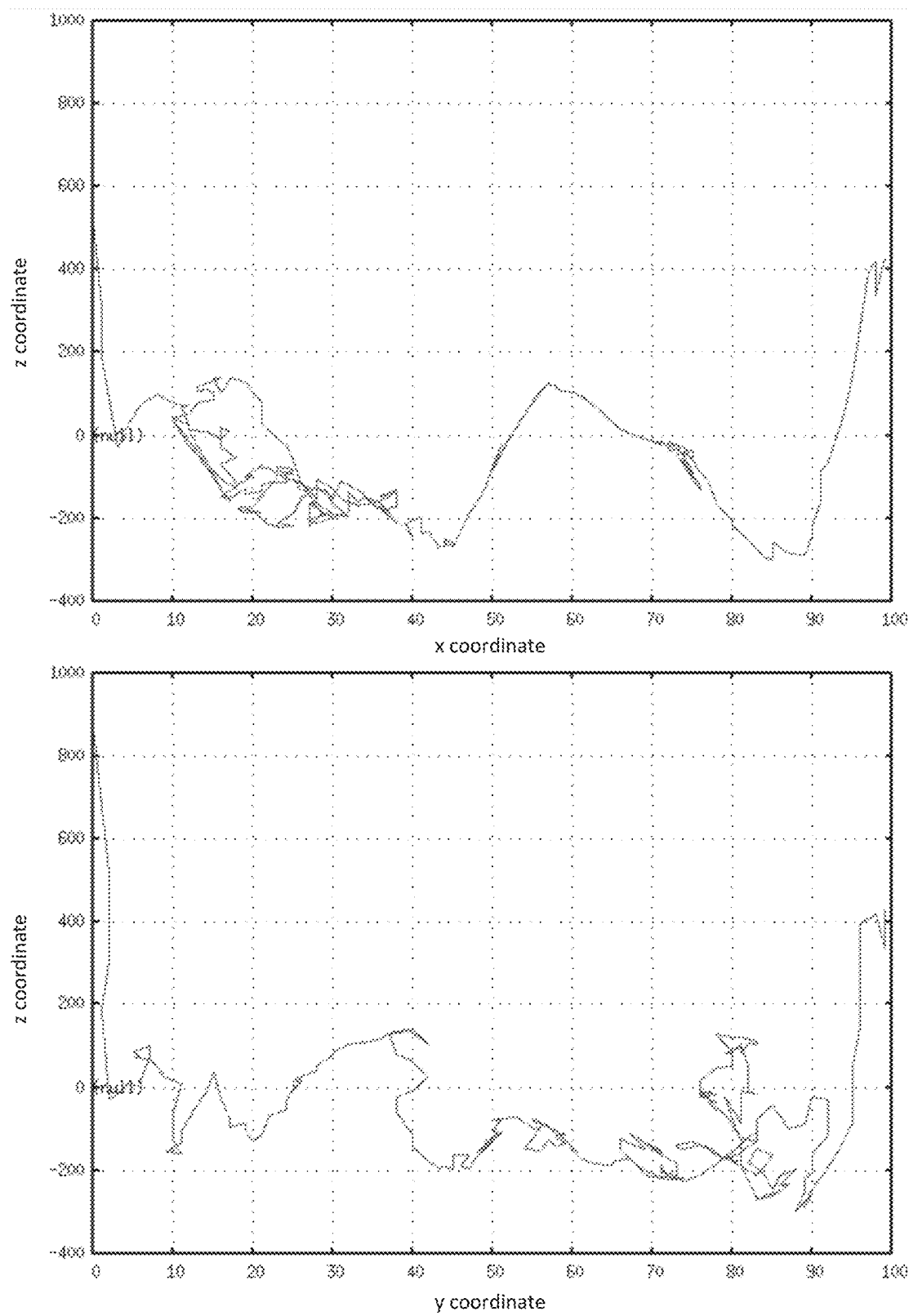
FIGS. 8A and 8B are x/z-plane and y/z-plane projections of the traverses of FIGS. 7D and 7E, respectively, in accordance with various embodiments of the present disclosure.
Figure 8B:
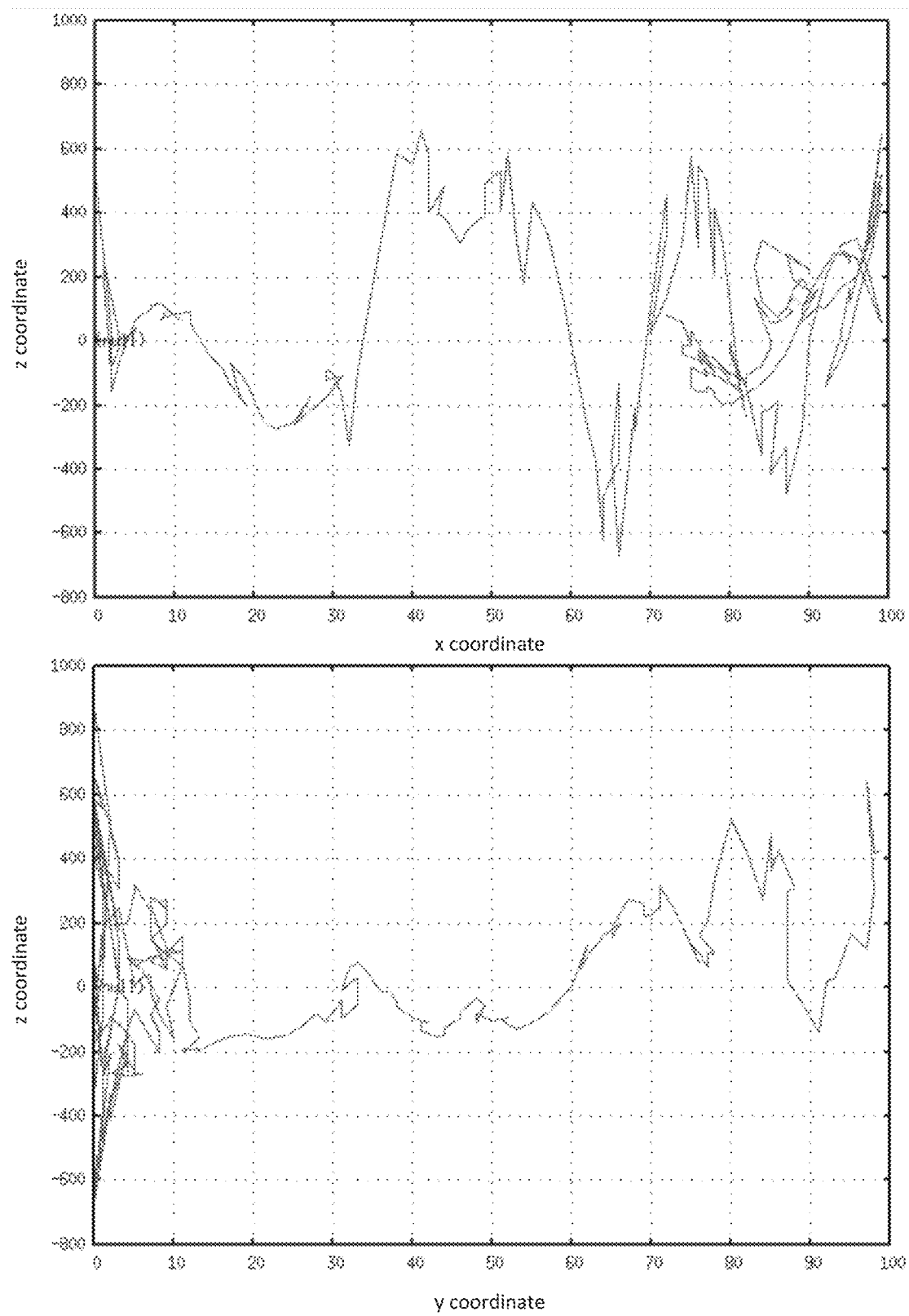

For comparison, FIGS. 8A and 8B show x/z-plane and y/z-plane projections for the minimum average terrain slope traverse (scenario #4) and the maximum average terrain slope traverse (scenario #5), respectively. In FIG. 8A, the top plot illustrates the x/z-plane-relief and the bottom plot illustrates the y/z-plane-relief of the minimized traverse shown in FIG. 7D. In FIG. 8B, the top plot illustrates the x/z-plane-relief and the bottom plot illustrates the y/z-plane-relief of the maximized traverse shown in FIG. 7E. As can be seen, the z-axis spread and the number of altitude changes are noticeably different.

As demonstrated above, the traverse-optimizing planner (TOP) can optimize for a wide range of applications and scenario constraints. For example, the following multi-objective deployment scenarios can be optimized for a planetary rover, or other vehicles or objects:

Routing with the lowest number of deployment segments;
Shortest traverse based on a 3D Euclidian distance measure;
Smoothest traverse (e.g., traverse through mostly benign terrain);
Traverse with the smallest average roughness;
Traverse with the smallest slope-change (e.g., least altitude changes);
Traverse with the smallest average slope-change; and
Combinations of the above constraints or other constraints (e.g., for smoothest and shortest traverse).

Moreover, an overarching "main traverse" can be broken into multiple segments, each with its own combination of optimization parameters. This can provide multiple advantages since a rover (or other vehicle or object) may traverse many diverse types of terrain, and may have different goals while traversing each segment. Additional constraints which are supported by the terrain data can be added directly to the system to be optimized with TOP. For example, waypoints (e.g., for interesting science targets) and/or avoidance points can be assigned to each traverse, and numerous alternate and Pareto-optimal traverses can be generated for each deployment scenario. Depending on the ground-truth in-situ assessment of terrain data, traversability by a deployed rover (e.g., Curiosity on Mars), the TOP can allow for frequent replanning or adjustment of traverses/missions. As such the TOP offers a versatile and useful mission-planning tool for a wide variety of traverse planning applications (e.g., robotic planetary surface exploration), and is capable of providing Pareto-optimal solutions for deployment scenarios to choose from. This can also be utilized for artificial limb, paralyzed limb, or other medical applications (e.g., for gamma knife or surgical systems).

The traverse optimizing planner (TOP) can be enhanced by tracking the vehicle (e.g., rover) or object as it moves along the traverse. This tracking can assist in the real time replanning or adjustment of the path or route being traversed. Tracking of objects can also be implemented as a separate task, independent of the TOP. Visual tracking of vehicles or objects can be accomplished using image capture devices (e.g., optical cameras, thermal imaging devices, radar or microwave imaging devices, or other imaging devices), where images that are obtained using the image capture device can be analyzed to identify vehicles or other objects, and used to track movements of the vehicle or object as it traverses along a route. The image capture device may be mounted on unstable platforms such as flying platforms (e.g., aerostats, balloons, blimps, orbiters, satellites, rotorcraft, fixed-wing, planes, or other aircraft) or floating platforms (e.g., boats or ships, or submarines), which can experience up to six-degrees of freedom (or more) with respect to the surface over which the vehicle or object is traversing or a volume through which the vehicle or object is moving. Alternatively, the surface on which, or volume through which the vehicle or object is traveling may be free to move with respect to the image capture device. For example, a patient's body can move by breathing or other activities, while a catheter or probe is inserted. Both the image capture device and the surface or volume can also move simultaneously. In either case, the reference frame for the image is not constant over time and will need to be compensated for in order to track the object or vehicle.

Figure 9A:
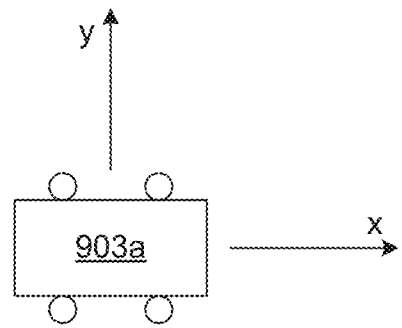
FIGS. 9A through 9E illustrate an example of object tracking with compensation for movement of an image capture device, in accordance with various embodiments of the present disclosure.
Figure 9A:
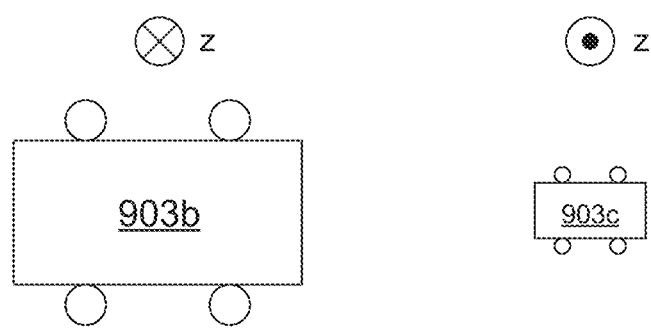
Figure 9A:
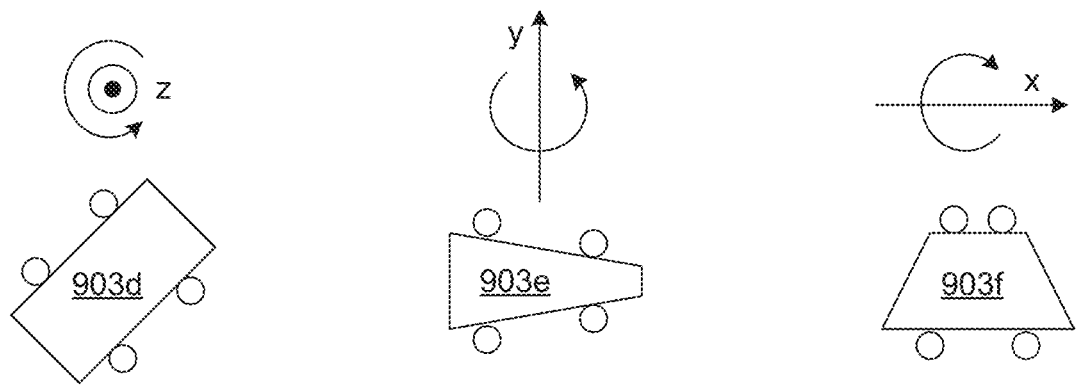

To compensate for this movement, the image data can be translated to a constant frame of reference. Movement of the image capture device can result in three forms of perceived change in a vehicle or object being tracked. FIG. 9A illustrates examples of the different types of motion. Assuming that an object 903 is fixed on an x/y plane, motion of the image capture device can produce visible changes in the image of the object 903 that can be identified. These will be referred to as translation, scaling and rotation. Translation corresponds to movement of the object 903a in (and/or the image capture device in parallel with) the x/y plane. In this case, the location of the object 903a moves but the size of the object 903a remains constant. Scaling corresponds to movement of the object 903 (and/or the image capture device) towards or away from the x/y plane (or along the z-axis). Movement of the image capture device towards the object 903 in the x/y plane (or towards the page along the z-axis) increases the size of the object 903b in the captured image and movement of the image capture device away from the object 903 in the x/y plane (or away from the page along the z-axis) reduces the size of the object 903c as illustrated in FIG. 9A. Both of these movements can be compensated for using 2D operations.

Rotations, however, offer additional complexity because they include rotations in the x/y plane (about the z-axis), in addition to rotations out of the x/y plane (about the y-axis and/or about the x-axis), or rotations about all three axes.

Rotation in the x/y plane (about the z-axis) changes orientation of the object 903d, while maintaining the size and shape. In contrast rotations out of the x/y plane deform the shape of the object 903e (rotation about the y-axis) and 903f (rotation about the x-axis). While the rotation in the x/y plane can be compensated for using 2D operations, rotations about the y-axis and x-axis are in 3D and normally need processing in the three dimensions in order to compensate for the movement, which is computationally intensive and time consuming. However, for compensation in a 2D image, the processing can be substantially simplified by replacing the 3D operations with skewed 2D projections. Since the image is in 2D, adjustments in the third dimension are not needed.

As can be understood, simultaneous movement of the object 903 and the image capture device can substantially complicate the ability to track an object. In order to distinguish between movement of the object 903 (or vehicle) from movement of the image capture device, fixed fiducial markers 906 that appear in the captured images can be used to determine the appropriate compensation for movement of the image capture device and/or the image frame (e.g., on a surface and/or within a volume) as illustrated in FIGS. 9B-9E. The fiducial markers 906 can be items or objects that are in known fixed locations (or geolocalized). For example, fiducial markers 906 can include mountains, lakes, or other naturally occurring or man-made feature that can be repeatedly identified in the captured images. In one embodiment, fiducial markers can be markers in a patient's body to support real-time x-ray visualization to support surgical interventions in real-time. In some implementations, fiducial markers can include radioisotopes, green fluorescent proteins, and/or other fluorescent materials to track chemical compounds and/or conformational changes of chemical compounds. Visual changes of the fiducial markers 906 in a captured image can be used to determine the movement, location and/or orientation of the capture device as illustrated in FIG. 9E. In turn, this information can be used to transform the captured image including the object back to a standard reference plane defined by the fiducial markers 906. By transforming each of a series of captured images back to the standard reference plane, the actual movement of the object 903 (or vehicle) can be extracted/revealed and tracked as illustrated in FIG. 9E. This can be accomplished using three transformations corresponding to the three previously described movements—translation, scaling, and rotation. Each of these transformations can be defined using operators that can be defined based on fiducial marker information. Each operator can be defined as a matrix that, when applied to data of the captured image, converts the data to the standard reference plane. FIGS. 9B-9E illustrate the transformation and tracking of an object 903 as it moves over time.

It should be noted that information about the image capture device above the surface (e.g., altitude), and/or about the size of the fiducial markers, and/or the image capture device resolution (e.g., the number of camera pixels a fiducial marker of known size is in width or diameter), and/or the camera viewing angle can aid in the determination of the relationship between a captured image and the standard reference plane. For example, with pixel resolution and camera angle, it is possible to calculate the distance (or altitude) above the surface.

Figure 9B:
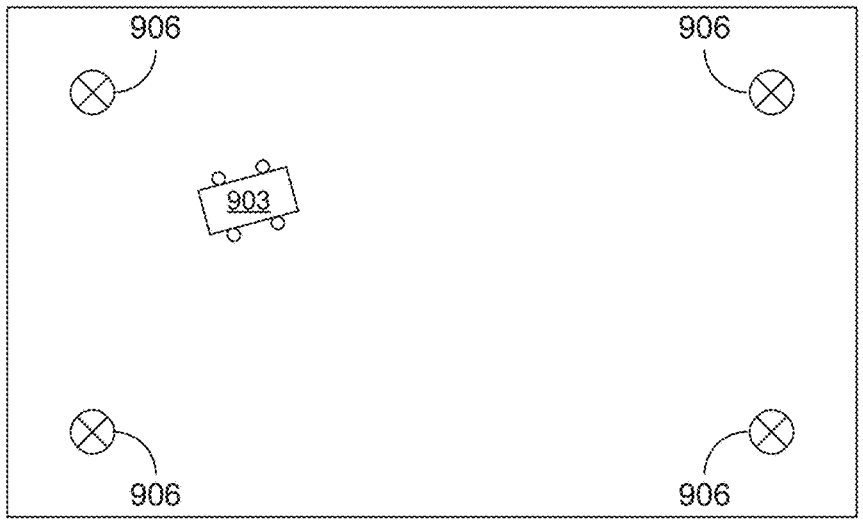

FIG. 9B shows an example of a captured image obtained using an overhead image capture device. While the fiducial markers 906 are evenly distributed at the corners of the image in the example of FIG. 9B, the fiducial markers can be located at any locations that would appear in the images captured by the image capture device. As discussed above, the fiducial markers 906 can be used to compensate for movement of the image capture device. For example, if the image capture device is mounted to a balloon suspended over the object 903, the image capture device can move vertically and horizontally in space, as well as pitch, roll, and yaw (e.g., due to wind). Similar movement can be experienced by an image capture device mounted on an aircraft in flight, a vessel on the water, a submarine, orbiters, satellite, or other supporting platform that is in motion.

Figure 9C:
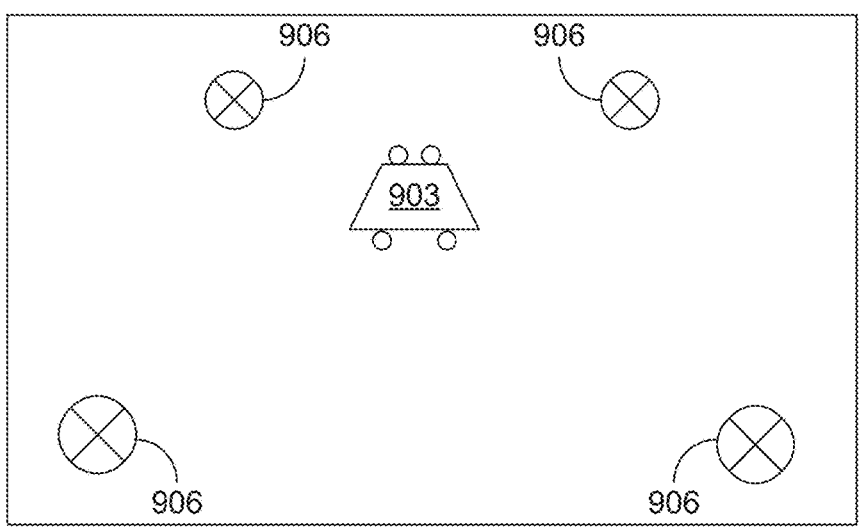
Figure 9D:
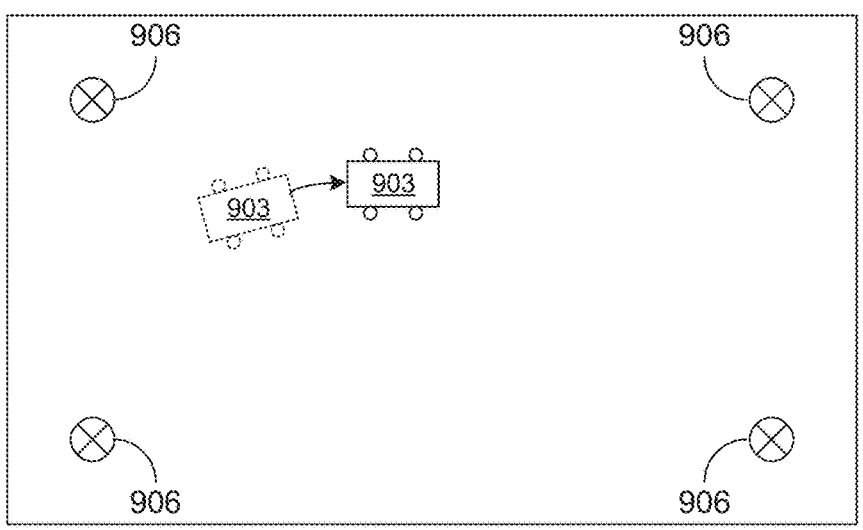
Figure 9E:
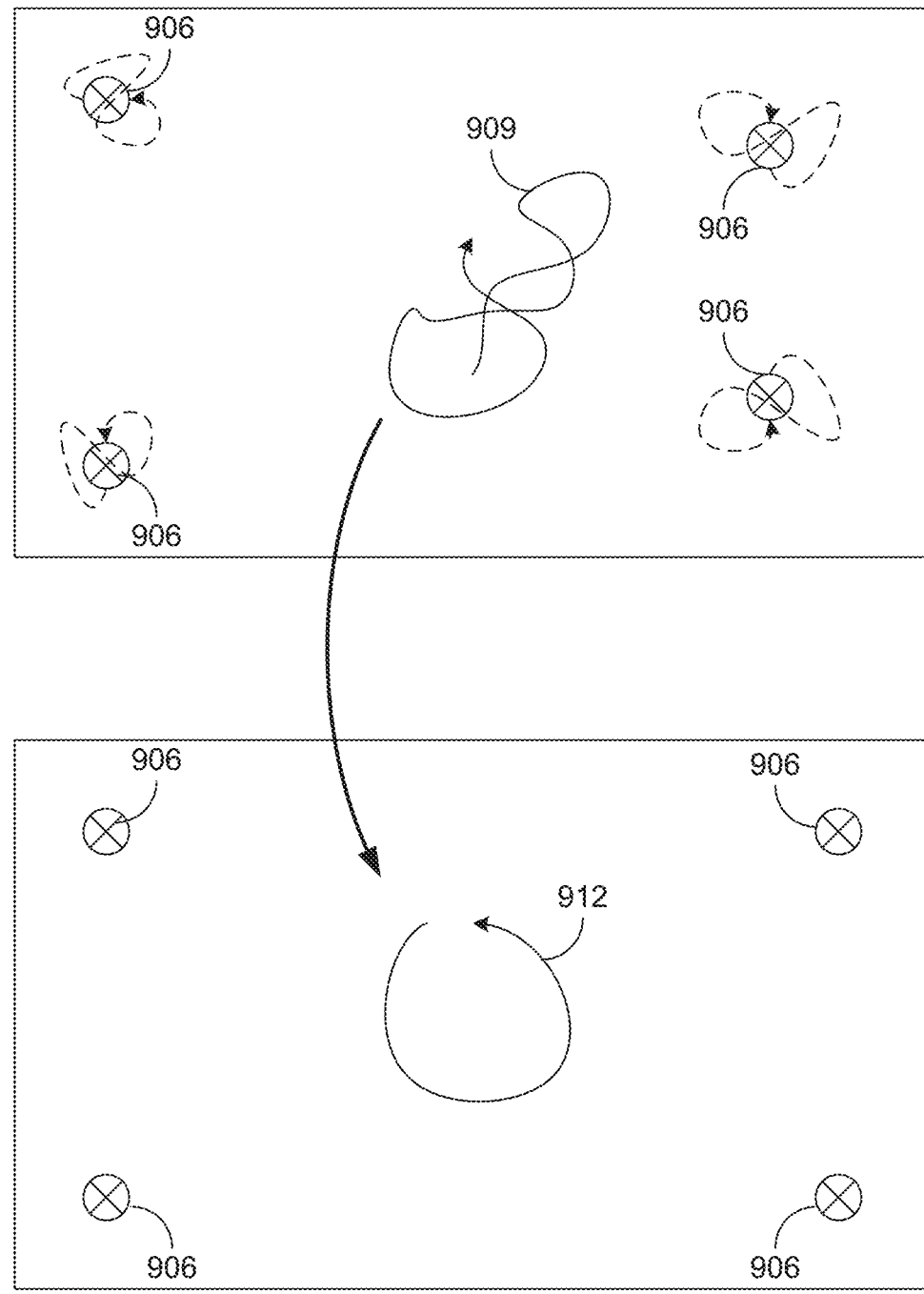

FIG. 9C shows an example of a subsequent captured image that was obtained after a period of time using the overhead image capture device. During that period of time, the position of the image capture device has changed such that it has moved closer to the object 903 while rolling away from the object 903. This movement results in visual changes in the fiducial markers 906 (both in size and location) and in the object 903. As illustrated in FIG. 9C, the size of the fiducial markers 906 increases and the locations of some of the fiducial markers 906 are shifted inward as a result of the movement. Other visual changes will be experienced by different movements of the image capture device as can be understood. During the same time period, the object 903 may also move (as illustrated in FIG. 9D).

The visual changes to the perceived object 903 further complicates identification of both the object 903 and its location. The fiducial markers 906 can be used to compensate for the changes produced by movement of the image capture device. The fiducial markers 906 can be used to generate or identify transformation operators for translation ($M_T$), scaling ($M_S$), and rotation ($M_R$). These transformation operators can then be used to transform the known image of the object 903 into an object template (or silhouette) that can be used to identify the object 903 in the subsequent image of FIG. 9C. In other implementations, the transformation operators can be used to transform the subsequent image of FIG. 9C back to the standard reference plane, as illustrated in FIG. 9D. Transformation of the captured image can aid in the identification of the object 903 and tracking of its movement. By using the appropriate translation ($M_T$), scaling ($M_S$), and rotation ($M_R$) operators, visual identification of the object is made easier, and movement of the object 903 from the time of the capture of the image in FIG. 9B to the time of the capture of the image in FIG. 9C can be determined. Thus, the translation ($M_T$), scaling ($M_S$), and rotation ($M_R$) operators can be applied to input data from a captured image series to provide output data that corresponds to the standard reference plane.

Real time tracking of the movement of any object 903 can be carried out with an image capture device that is free to move (e.g., with six degrees of freedom) using this technique. FIG. 9E illustrates an example of the real time tracking of an object using a series of images captured by an image capture device that can constantly vary in position. As shown in the top example of FIG. 9E, the movement of the image capture device can be identified based upon changes in the fiducial markers 906. As can be seen, movement of the image capture device over time can result in a seemingly chaotic movement of the object 903 in the series of captured images, which is illustrated by track 909. By identifying the transformation operators for each of the captured images, it is possible to determine the actual 3D movement of the object 903 (e.g., a vehicle moving over hills). In the example of FIG. 9E, the movement of the object 903 can be transformed from the seemingly chaotic track 909 to a resolved track 912, which indicates the actual movement of the object in the projected x/y plane. This is true even if there is no movement of the image capture device.

While the tracking of the object has been described with respect to a moving image capture device, it can also be applied where the image capture device is in a fixed location and the surface on (or the volume in) which the object is located is allowed to move. For example, movement of a sensor or probe along the skin of a patient may be tracked. In that case, the surface of the patient may be in motion because of breathing or physical movement of the patient. If fiducial markers 906 are provided on the patient, movement of the patient during tracking of the sensor or probe can be compensated for using the same method described above. In another example, the landing barge for a space rocket (e.g., Space X Falcon 9) is moving in 3 dimensions on the sea and has to be imaged from aboard a landing rocket vehicle. Other examples of tracking and/or control can include, but are not limited to, real time adjustment of the aim of a gamma knife, particle flow profiles within a fluid, missile tracking, and/or tracking of vessels or debris on the water or in space. In addition, artificial limbs and paralyzed limbs that are stimulated can be tracked for control feedback.

For object identification and tracking, the initial identification of the object 903 in a captured image can be time consuming without information about the initial location. Because the orientation of the object 903 may not be known, a large number of known or pre-defined object templates (or silhouettes) may be compared to the data of the captured image to identify the object 903. In addition, the whole image will be searched to identify the object and its location. The time to complete this will be based upon the amount of computational resources that are available. However, once the object 903 has been identified, real time tracking of the object 903 can be implemented using the method described above. Transformation of the captured images can significantly reduce the processing needed to identify the object 903 and its location in subsequent images. In addition, by slightly modifying the transformation operators from the previous image frame, real time tracking may be accommodated with significantly reduced processing. The resolved movement of the object 903 along track 912 can be used to provide feedback (e.g., a deviation or error signal) for control of the object 903. For example, the tracking information can be used to ensure movement of the object 903 along a traverse that was optimized by the traverse optimizing planner (TOP) based on defined constraints and terrain information as described above. The disclosed initial and subsequent template matching can be accomplished utilizing the same SOF as that underlying the TOP. The deformations of a silhouette-template to match the object/vehicle in the standard reference plane (or the captured image), can be determined by the SOF, which also determines the appropriate translation ($M_T$), scaling ($M_S$), and rotation ($M_R$) operators. In some cases, the object may be partially occluded. In those cases, partial template or pattern matching can be utilized to identify the object.

Once a silhouette-template has been matched to the object/vehicle using SOF, and after the appropriate translation ($M_T$), scaling ($M_S$), and/or rotation ($M_R$) operators have been determined using SOF for an image frame, the matched template and the translation operators can be used as the starting point for the processing of the next image frame, e.g., catering to the presumed fact that the object/vehicle has not changed its position and attitude too dramatically between the previous image frame and the next image frame. That can depend on the image frame frequency, the velocity of the object(s), and/or the image capture device. Therefore, rather than starting from scratch every single time for every new image frame, one can take advantage of the prior determined template match and the prior determined translation operators as educated and informed starting "guesses" to refine them for the next image frame rather than determining them from scratch, which would be computationally much more involved and time-taking.

A wide range of tracking applications can use the TOP and image tracking that have been described. For instance, space situational awareness (SSA) refers to the ability to view, understand, and predict the physical location of natural and man-made objects in orbit, e.g., about the Earth, with the objective of avoiding collisions. It becomes more and more important to be able to accurately model and track a large number of objects/debris for the above stated reasons. In particular it is important to extract the exact orbital parameters/trajectory for each object. When observing these objects/debris with telescopes one can obtain the orbital parameters/trajectories by comparing the location of each object with respect to the (for the most part) non-moving, i.e., fixed stars, which can act as fiducial markers. One caveat is potential telescope drift, i.e., motion of the telescope, which results in a movement of the star field and object(s) within the viewing frame of the telescope. As such a TOP-like tracking framework can be employed to retroactively "undo" the motion of the telescope to extract the so-corrected true trajectory of the object(s)/debris of interest.

The TOP and image tracking described above can also be utilized in many other applications such as, e.g., learning applications where control of prosthetics (e.g., artificial limbs) or stimulated natural limbs is being mastered by a patient. This could apply to an artificial limb (e.g., prosthetic arm), but could also apply to situations where a patient had previously lost the ability to control a natural limb, but where electrodes had subsequently been implanted in the limb (e.g., a paralyzed arm) to allow stimulation of the patient's muscles to produce movement. In either case, a neural controller can be used to control movement of the prosthetic (or natural limb).

Figure 10:
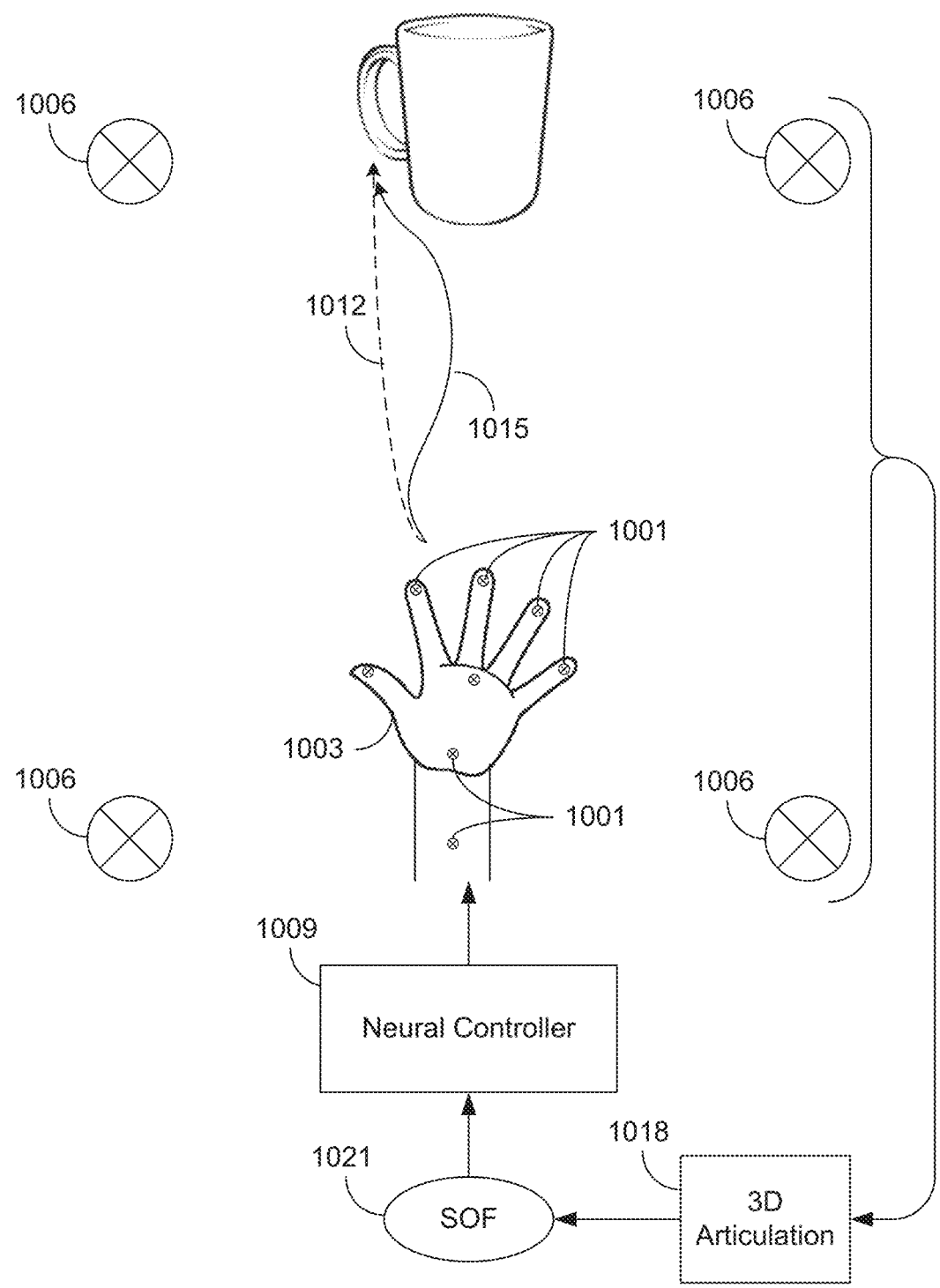
FIG. 10 illustrates an example of an evolving optimizing system for movement control of an object, in accordance with various embodiments of the present disclosure.

Referring to FIG. 10, shown is an example of an evolving optimizing system that can be used to control, e.g., a prosthetic or limb. In the example of FIG. 10, a prosthetic arm (or natural limb) 1003 is controlled by the patient through a neural controller 1009. Electronic signals that are sensed from the patient (e.g., residual muscle signals, brainwaves, brain-signals indicating the intent to move the limb or prosthetics, eye-tracking, etc.) can be interpreted by the neural controller 1009 to cause the prosthetic or limb 1003 to move as desired, i.e., along a desired trajectory in 3D space. The relationship between the sensed electronic signals and movement of the prosthetic or limb 1003 is a learned process. The control signals can be sent to the prosthetic device 1003 or can be converted to produce intermuscular and/or intramuscular stimulation of the limb. Control of robotic devices can be accomplished in a similar fashion.

The learning by the neural controller may be enhanced using the TOP and the tracking system. The TOP can be used to determine an optimized traverse 1012 that the prosthetic or limb 1003 should move along to achieve a desired result (e.g., reaching for the handle of a mug). An image capture device can be used to track movement and orientation of the prosthetic or limb 1003. The prosthetic or limb 1003 can include fiducial markers 1001 to facilitate identification and tracking of the prosthetic or limb 1003. Fiducial markers 1006 can be used to allow the orientation and position of the prosthetic or limb 1003 to be tracked along the desired traverse 1012. As the prosthetic or limb 1003 moves along the actual path of travel 1015, captured images can be used to define the 3D articulation 1018 of the prosthetic or limb 1003, utilizing the transformation methods describe above. Moreover, deviation or error signals can be generated by comparing the actual path of travel 1015 with the desired or optimized traverse 1012. Fiducial markers can also be placed at other locations on the body or object to assist with tracking and identification of conformational changes. The output from the 3D articulation 1018 can be used in a stochastic optimization framework (SOF) 1021 to provide feedback (e.g., a deviation or error signal) to the neural controller 1009 for adjustment of the movement of the prosthetic or limb 1003 and/or modification to the learning of the neural controller such as, e.g., modifying the neural controller and/or algorithm(s) therein. In one embodiment, the neural controller may comprise an artificial neural network. In yet another embodiment, the neural controller may be a proportional-integral-derivative (PID) type controller. In yet another embodiment, the neural controller is a nonlinear deterministic controller. Other neural controllers known to the one skilled in the art may be used.

Figure 11:
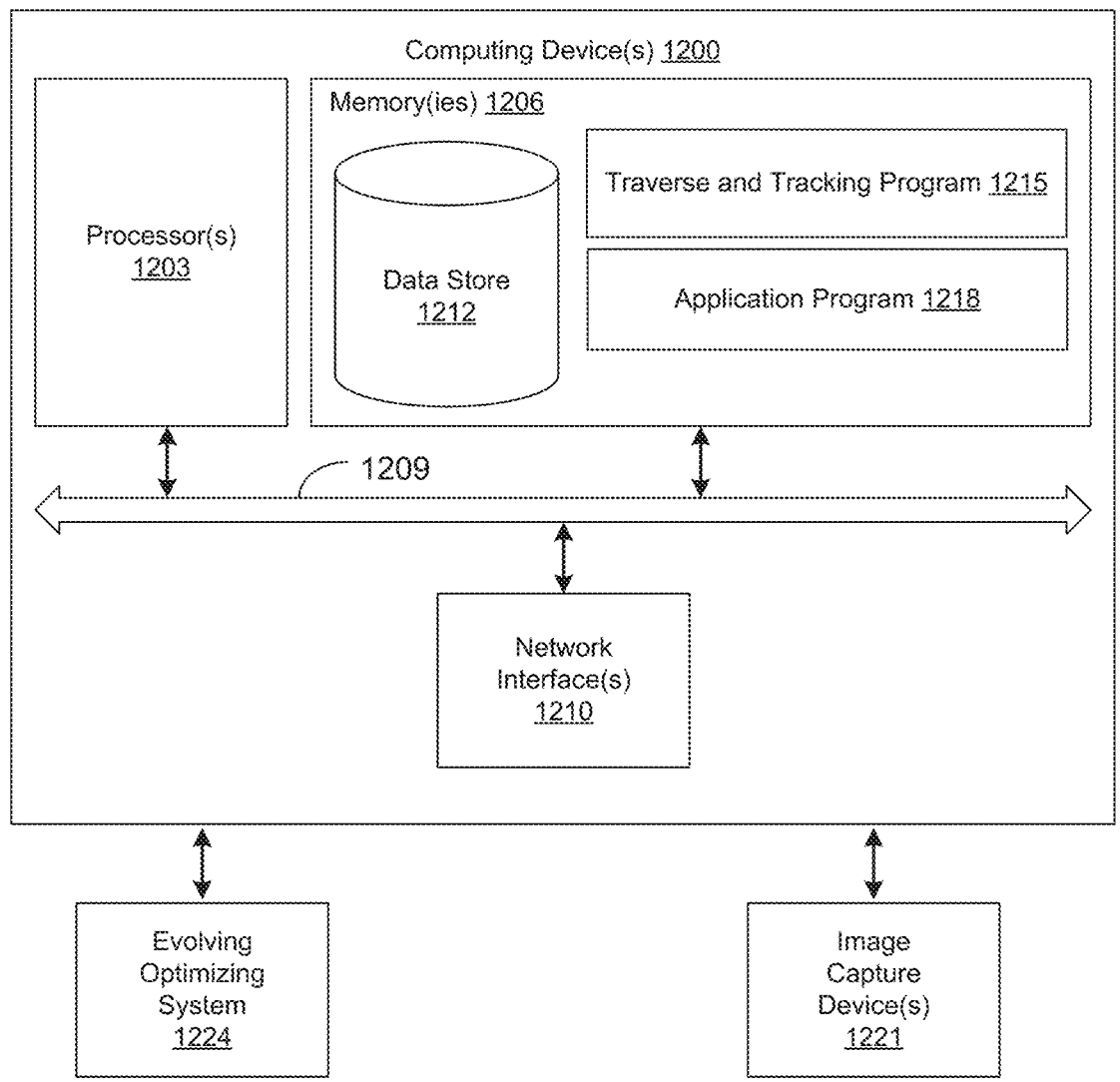
FIG. 11 is a schematic diagram illustrating an example of a computing system for implementing the TOP, object tracking and/or evolving optimizing system, in accordance with various embodiments of the present disclosure.

With reference to FIG. 11, shown is a schematic block diagram of a computing device 1200. In some embodiments, among others, the computing device 1200 may represent a mobile device (e.g., a smartphone, tablet, computer, etc.). Each computing device 1200 includes at least one processor circuit, for example, having a processor 1203 and a memory 1206, both of which are coupled to a local interface 1209. To this end, each computing device 1200 may comprise, for example, at least one server computer or like device, which can be utilized in a cloud based environment. The local interface 1209 may comprise, for example, a data bus with an accompanying address/control bus or other bus structure as can be appreciated.

In some embodiments, the computing device 1200 can include one or more network interfaces 1210. The network interface 1210 may comprise, for example, a wireless transmitter, a wireless transceiver, and/or a wireless receiver. As discussed above, the network interface 1210 can communicate to a remote computing device using a Bluetooth, WiFi, or other appropriate wireless protocol. As one skilled in the art can appreciate, other wireless protocols may be used in the various embodiments of the present disclosure. In addition, the computing device 1200 can be in communication with one or more image capture device(s) 1221 and/or an evolving optimizing system 1224, such as the example in FIG. 10.

Stored in the memory 1206 are both data and several components that are executable by the processor 1203. In particular, stored in the memory 1206 and executable by the processor 1203 can be a traverse and tracking program 1215, application program 1218, and potentially other applications. Also stored in the memory 1206 may be a data store 1212 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, holographic storage, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and/or multiple processor cores, and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the traverse and tracking program 1215 and the application program 1218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the traverse and tracking program 1215 and the application program 1218, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the traverse and tracking program 1215 and the application program 1218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1200, or in multiple computing devices in the same computing environment 103. To this end, each computing device 1200 may comprise, for example, at least one server computer or like device, which can be utilized in a cloud based environment. Additionally, it is understood that terms such as "application," "service," "system," "engine," "module," and so on may be interchangeable and are not intended to be limiting.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising:
    determining a terrain map including at least one associated terrain type, wherein the terrain map comprises a two-dimensional (2D) terrain type map identifying the at least one associated terrain type;
    determining a recommended traverse along the terrain map based upon at least one defined constraint associated with the at least one associated terrain type, wherein the recommended traverse is determined using a stochastic optimization framework (SOF); and
    transmitting control instructions to an object, the control instructions initiating movement of the object along the recommended traverse.

2. The method of claim 1, wherein the terrain map comprises a 3D terrain plot corresponding to a surface and the object is a vehicle configured to move along the surface.

3. The method of claim 2, wherein the surface is a planetary surface and the vehicle is a planetary rover.

4. The method of claim 1, wherein the at least one associated terrain type comprises terrain roughness or traversability.

5. A method, comprising:
    determining a transformation operator corresponding to a reference frame based upon at least one fiducial marker in a captured image comprising a tracked object;
    converting the captured image to a standardized image based upon the transformation operator, the standardized image corresponding to the reference frame;
    determining a current position of the tracked object from the standardized image; and
    correcting movement of the tracked object based upon feedback generated using the current position and a traverse along which the tracked object is instructed to move.

6. The method of claim 5, comprising determining a change in position of the tracked object based upon the current position and a previous position determined from a preceding standardized image.

7. The method of claim 5, wherein the at least one fiducial marker comprises a geolocalized marker having a known fixed location.

8. The method of claim 5, wherein the standardized image is converted from the captured image based upon a plurality of transformation operators.

9. The method of claim 5, wherein the transformation operator is at least one of a translation operator, a scaling operator, or a rotational operator.

10. The method of claim 5, wherein the captured image is obtained by an image capture device that moves with up to six degrees of freedom.

11. The method of claim 10, wherein the image capture device is suspended over an area of interest.

12. The method of claim 5, comprising identifying the tracked object in the captured image prior to converting the captured image to the standardized image.

13. The method of claim 5, comprising identifying the tracked object in the standardized image.

14. The method of claim 5, comprising:
- comparing the current position of the tracked object to the traverse along which the tracked object is instructed to move; and
- generating the feedback based upon the comparison of the current position to the traverse.

15. The method of claim 5, wherein the traverse is a recommended traverse determined by:
- determining a terrain map including at least one associated terrain type; and
- determining the recommended traverse along the terrain map based upon at least one defined constraint associated with the at least one associated terrain type.

16. The method of claim 5, wherein the tracked object is a prosthetic limb or a natural limb of an individual.

* * * * *